United States Patent [19]

Conselvan et al.

[11] Patent Number: 5,473,825
[45] Date of Patent: Dec. 12, 1995

[54] PROCESS FOR CONTINUOUSLY DRYING AND STABILIZING PASTA AND THE LIKE, AND APPARATUS FOR IMPLEMENTING THE PROCESS

[75] Inventors: Pier L. Conselvan, Selvazzano; Gastone Didone', Galliera Veneta, both of Italy

[73] Assignee: Pavan Mapimpianti S.p.A., Italy

[21] Appl. No.: 107,686

[22] PCT Filed: Mar. 2, 1992

[86] PCT No.: PCT/EP92/00451

§ 371 Date: Aug. 23, 1993

§ 102(e) Date: Aug. 23, 1993

[87] PCT Pub. No.: WO92/16806

PCT Pub. Date: Oct. 1, 1992

[30] Foreign Application Priority Data

Mar. 21, 1991 [IT] Italy .................................. VE91A0018

[51] Int. Cl.[6] .................................................. F26B 7/00
[52] U.S. Cl. .................................. 34/389; 34/438; 34/493; 34/218; 426/456
[58] Field of Search ............................ 34/389, 391, 395, 34/428, 429, 203, 205, 207, 216, 217, 218, 104, 105, 437–441, 493, 535; 426/455, 456, 458

[56] References Cited

U.S. PATENT DOCUMENTS

| | | | |
|---|---|---|---|
| 2,531,870 | 2/1947 | Bettini | 34/190 |
| 2,732,627 | 12/1952 | Fava | 34/48 |
| 2,790,250 | 2/1954 | Giroud | 34/207 |
| 3,209,465 | 9/1962 | Arena | 34/28 |
| 4,699,048 | 10/1987 | Pavan | 34/62 |
| 4,775,542 | 10/1988 | Manser et al. | 426/458 |
| 5,026,567 | 6/1991 | Manser et al. | 426/458 |
| 5,216,949 | 6/1993 | Bertozzi | 34/218 |

FOREIGN PATENT DOCUMENTS

| | | |
|---|---|---|
| 1142794 | 1/1963 | France . |
| 2094632 | 6/1970 | France . |
| 2368000 | 10/1977 | France . |
| 2538887 | 12/1982 | France . |
| 2562647 | 4/1984 | France . |
| 178309 | 6/1966 | U.S.S.R. . |

*Primary Examiner*—Denise L. Gromada
*Attorney, Agent, or Firm*—Hoffman, Wasson & Gitler

[57] ABSTRACT

A process for continuously drying and stabilizing pasta and the like in which the product to be treated is subjected to a succession of cycles each including of an intense drying stage and a stabilizing stage for cooling in which the air temperature exceeds the dew point, characterized in that during the stabilizing phase the pasta is ventilated, whereby the ventilated air is indirectly heated or cooled by a conditioning fluid to create and maintain in the chamber the temperature and humidity required to the particular stabilization treatment.

7 Claims, 4 Drawing Sheets

PROCESS FOR CONTINUOUSLY DRYING AND STABILIZING PASTA AND THE LIKE, AND APPARATUS FOR IMPLEMENTING THE PROCESS

This invention relates to a process for continuously drying and stabilizing pasta and like, and an apparatus for implementing the process.

Production processes for pasta generally comprise a final drying stage in which the water content of the pasta is reduced to an average of 10–13% by weinght, to ensure a long product shelf life. This drying stage does not result in uniform drying throughout the entire pasta mass, but involves water evaporation from its outer surface and migration of further water from the pasta interior to the surface layers, to recreate the equilibration which the surface evaporation alters.

This drying is sometimes done slowly so as not to create mechanical stresses within the pasta which could result in product damage during its subsequent packaging, storage, transportation and cooking, but in this case the drying time is excessively long and the plant is very large, with high operating costs.

The pasta drying can also be done at a high rate, but alternating the drying stages with stabilization stages, in which the pasta, the surface of which has dried to an extent greater than that desidered, is subjected to a surface remoisturizing stage which restores the plasticity lost during the preceding rapid drying stage.

In Italian Application Nr. 41583 A/86 the pasta is remoisturized after an intense drying stage, by spraying water into a part of the drier. However with this method there is the danger of wetting the product to be treated.

It is also known to remoisturize the pasta after an intense drying stage, by injecting steam. This method requires a steam generator, the cost of which is added to the plant cost, and also involves an energy cost in its operation.

It also carries the danger of introduction of chlorine compounds into the drier because of possible imperfect operation of the water treatment plant used for generating the steam. This can result in rapid corrosion of the stainless steel used in the drier construction.

Finally, the steam produces a temperature increase in the pasta, whereas in this stage a temperature reduction would be desiderable to avoid an excessive heat load for the final cooler and a corresponding increase in energy costs.

In addition to these drawbacks of known pasta stabilization processes, it should be noted that generally a single drying and stabilization cycle is insufficient, but instead several cycles are required in which the pasta is subjected to alternations of only a limited extent, in order as far as possible to liken the forced drying process to the natural tendency of the pasta to continuously vary its moisture content. Moreover, this alternation of drying and remoisturizing stages means that different climates must be provided, with obvious high installation and running costs.

DE-B-1.142.794 describes a tunnel dryer for long pasta goods with a conveyor tunnel subdivided into ventilated areas and not ventilated areas.

U.S. Pat. No. 2,790,250 relates to an automatic and continuous process for drying alimentary pasta goods in which the goods are continuously and alternatively conveyed through areas of circulating heated air and "dead" or not circulating air areas.

FR-A-2.562.647 describes a drying process for pasta comprising additional phases of ventilations, of resting and of cooling.

U.S. Pat. No. 2,732,627 relates to the drying of alimentary pasta comprising a drying chamber in which ventilated zones are alternatively followed by zones having still air therein.

According to the invention, a satisfactory continuous drying and stabilization of pasta and the like is achieved by a process as described in claim 1.

To implement the aforedescribed process the invention uses an apparatus as described in claim 5.

Some preferred embodiments of the present invention are described hereinafter with reference to the accompanying drawings in which.

Figure 1:
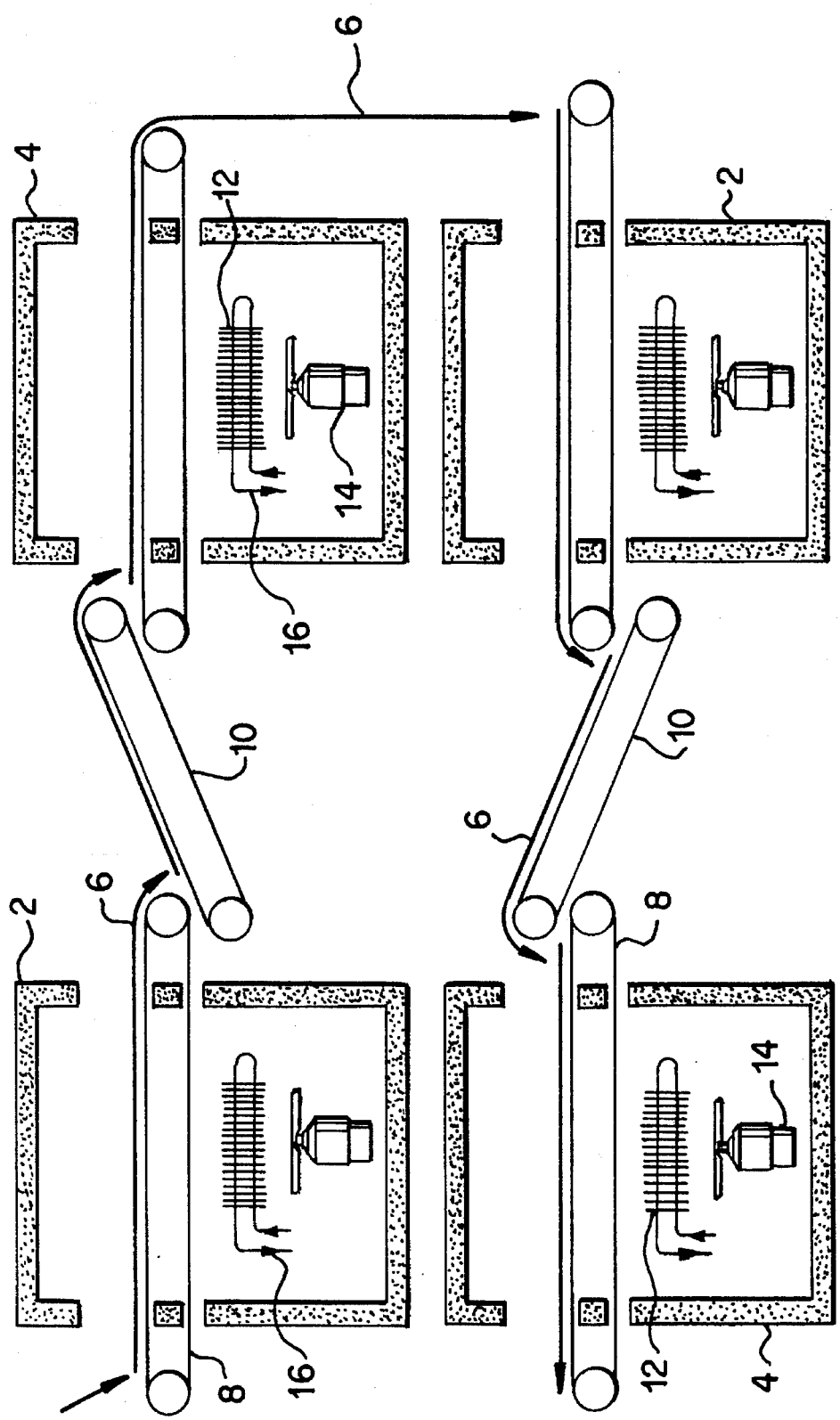
FIG. 1 is a schematic section through a first embodiment of the apparatus according to the invention.

As can be seen from FIG. 1, the apparatus of the invention, in the embodiment shown in FIG. 1, comprises a plurality of environments consisting respectively of intense drying chambers 2 and remoisturizing chambers 4. The chambers are positioned alternately along an ideal path which the pasta 6 is to undergo from the commencement to the end of treatment. For this pourpose, each chamber 2,4 is traversed by a conveyor belt 8, the ends of which emerge from the opposing walls of the chamber, the conveyor belts of two successive chambers being connected together by further conveyor connection belts 10.

Each chamber 2,4 houses a bank of fins 12 and a fan 14, facing it, for circulating the conditioning air. The bank of fins 12 is associed with a pipe 16 which extends into an external circuit comprising a heat exchanger 18, a three-way valve for controlling the fluid flow rate through the pipe 16, and a control valve 22 for controlling the entry of cold water into the heat exchanger 18.

In the chamber 2,4 there are also provided two probes 24 and 26 for measuring respectively the temperature and humidity of the air within the chamber, a further probe 28 being positioned in the pipe 16 to measure the temperature of the condioning fluid at the entry to the bank of fins 12.

The output signals from the three probes 24,26 and 28 are fed to a temperature controller, preferably a computer 30, the purpose of which is to control both the three-way valve 20 and the control valve 22.

The operation of the apparatus of the invention, with reference for example to the stabilization chamber 4, is as follows:

the temperature and humidity measured by the two probes 24 and 26 are fed to the processor 30 and compared with the preset values memorized therein. Using these data, the processor 30 by means of a suitable algorithm calculates the dew point, this being the minimum allowable temperature for the water circulating through the pipe 16 of the bank of fins 12. The processor 30 also compares the temperature measured by the probe 28 immediately upstream of the bank of fins 12 with the calculated dew point and, using a suitable algorithm, generates a signal to be fed to the control valve 22 to regulate the entry of cold water into the heat exchanger 18. In this manner it is possible to create and maintain in the chamber 4 the temperature and humidity required for the particular stabilization treatment.

An analogous circuit for the chamber 2 aslo enables the temperature required for that treatment stage to be obtained.

In this manner the pasta 6 to be treated passes through the various environments one after another, and at each passage is subjected to an intense drying stage which reduces the average moisture content to below the final desired value, with a greater internal water content and a lesser surface water content, and then to remoisturizing stage obtained by cooling the pasta with the air temperature exceeding the dew point to prevent condensation of environmetal moisture.

The pasta is therefore subjected to an alternation of climates which increasingly approach the final conditions to be attained, so that on termination of the process the pasta is completely dried and stabilized.

The aforedescribed system enables the climatic conditions within each chamber to be controlled with satisfactory precision, but has obvious high instalation and operating costs because of the need for a plurality of separate environments and a separate air conditioning system for each environment.

Figure 3:
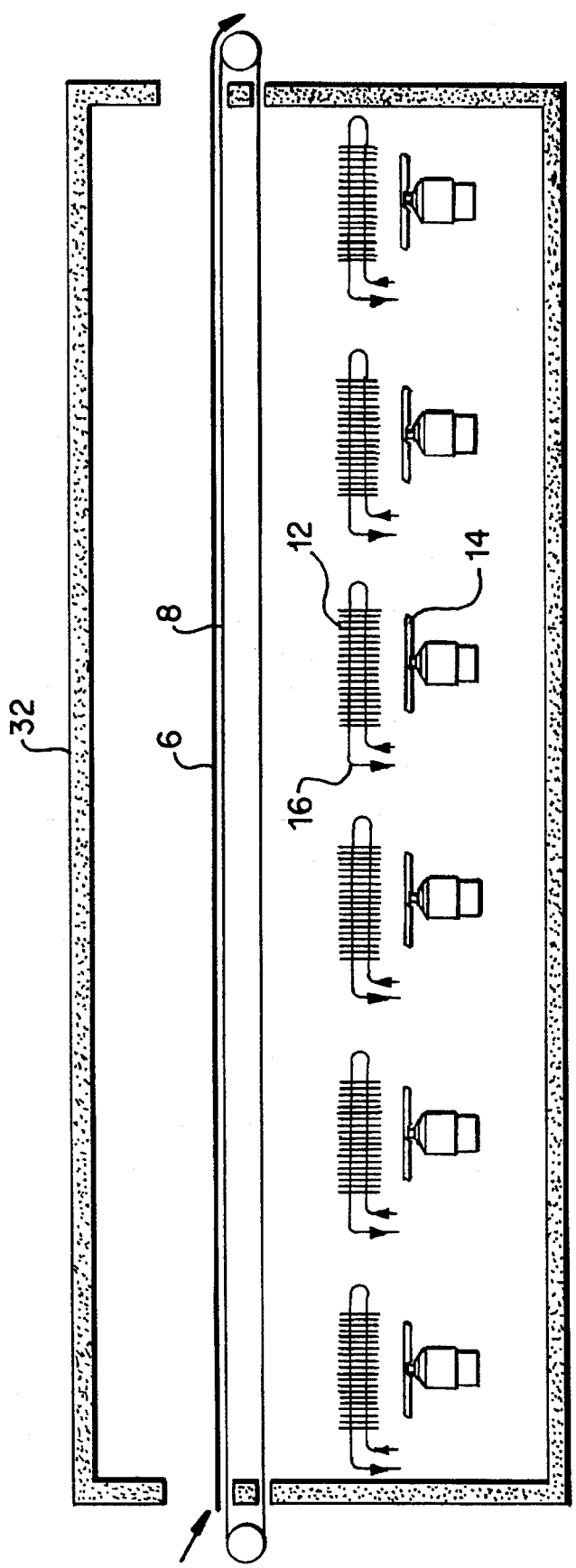
FIG. 3 is a schematic section through a different embodiment of the apparatus according to the invention.

In the embodiment shown in FIG. 3 there is a single tunnel 32 traversed by a conveyor belt 8 on which the pasta 6 to be treated is placed.

Figure 2:
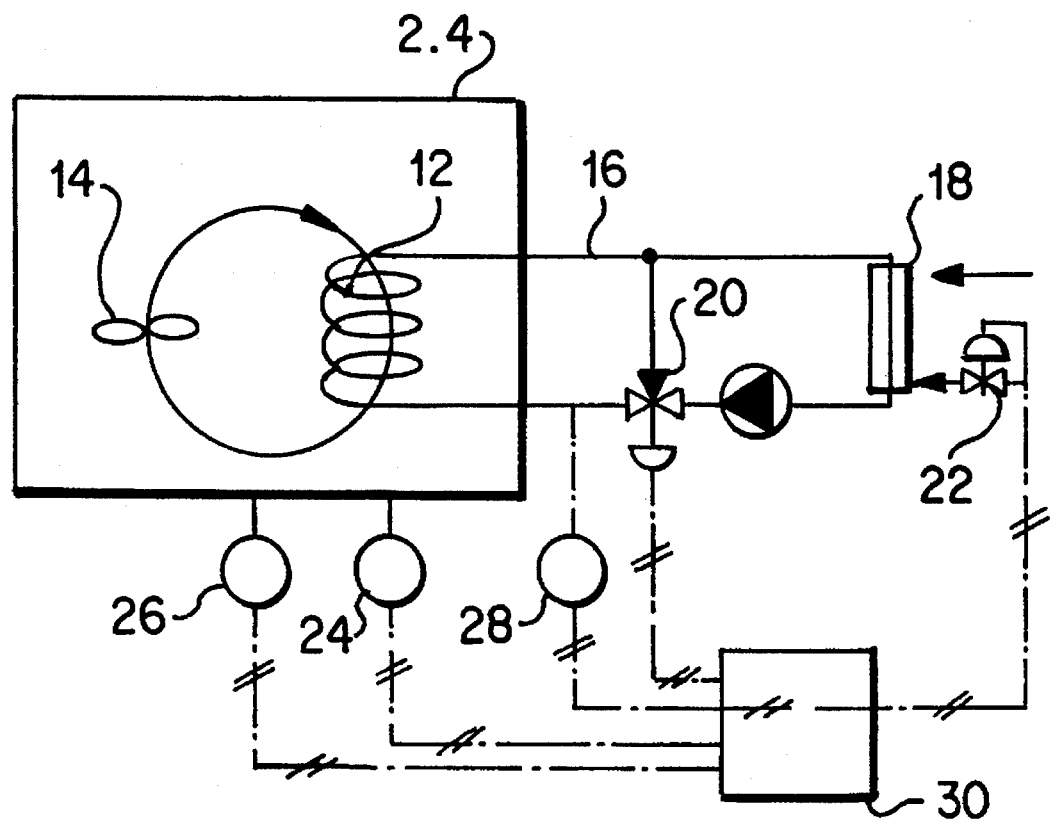
FIG. 2 shows the outline scheme of the circuit for air conditioning the environment in which an intense drying stage of the process according to the invention takes place.

The tunnel contains, in the direction of its lenght, a plurality of banks of fins 12, each of which is associated with a fan 14 and a pipe 16 connected to an external circuit, of the type already described with reference to FIG. 2. The purpose of the succession of banks of fins 12 is to create within the tunnel alternate drying and moisturizing regions, and are therefore associated with heating and cooling circuits respectively.

Consequently the pasta 6 transported by the belt 8 along the tunnel 32 passes alternately through heated and cooled regions and is subjected to a succession of cycles each consisting of a drying stage and a moisturizing stage which cause it to be perfectly dry and stabilized an leaving the tunnel 32.

This embodiment is more advantageous than the preceding because there is only one treatment chamber, with resultant lesser installation and operating costs. However the lack of precise separation between the regions of different climate makes it more difficult to control the climatic conditions of each region.

Figure 4:
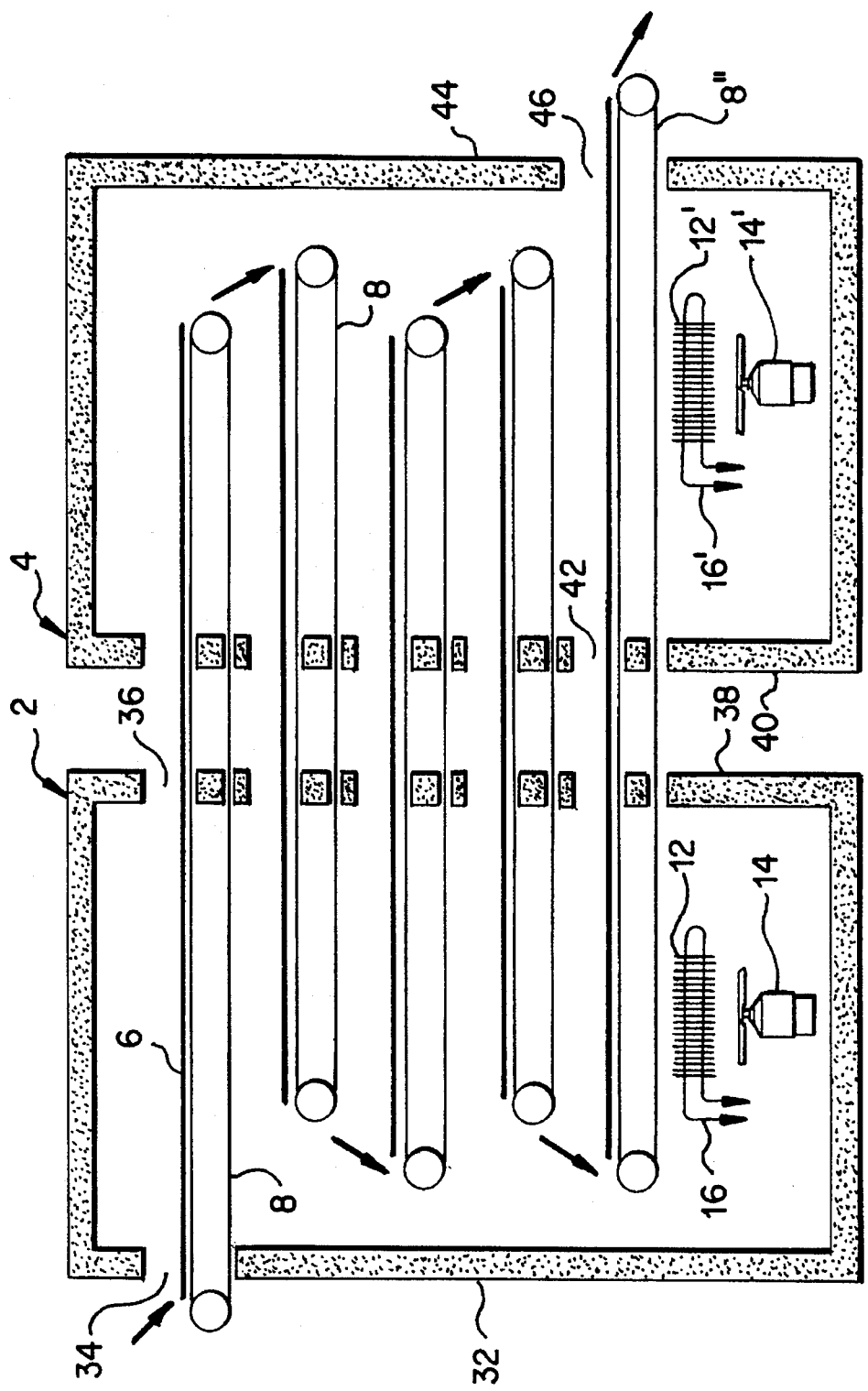
FIG. 4 is a schematic section through a further embodiment of the apparatus according to the invention.

The embodiment shown in FIG. 4 combines the merits of the two preceding embodiments, while at the same time overcoming their drawbacks. In this embodiment the apparatus comprises two separate mutually facing chambers consisting of an intense drying chamber 2 and a remoisturizing chamber 4. The drying chamber 2 is provided in that wall 33 distant from the chamber 4 with an entry aperture 34 for a conveyor belt for the pasta 6 to be treated, and is also provided with a plurality of apertures 36 in that wall 38 facing the chamber 4.

Likewise the chamber 4 is provided in that wall 40 facing the wall 8 with a plurality of apertures 42 facing the corresponding apertures 36 of said wall 38, for the passage of a plurality of other conveyor belts 8, and is also provided in the opposing wall 44 with an aperture 46 for the passage of an exit conveyor belt 8".

Both the chambers 2,4 are also provided with a bank of fins 12,12' and a fan 14,14' facing it, for circulating the conditioning air.

The bank 12 is associated with a conventional heating fluid circuit 16, and the bank 12' is associated with a cooling fluid circuit 16'.

The operation of this embodiment of the apparatus according to the invention is as follows:

the pasta 6 to be dried, conveyed by the conveyor belt 8', enters the drying chamber 2, in which the climatic conditions favouring this drying have been created. As the same conveyor belt 8' then enters the remoisturizing chamber 4, the pasta 6 already partly dried on its surface is subjected to surface remoisturizing to complete the first cycle. The same pasta 6 then leaves the chamber 4 to re-enter the chamber 2, in which it is subjected to its next drying stage before re-entering the chamber 4, where it undergoes its next stabilization stage, and so on until it is transferred by the conveyor belt 8" to the outside on termination of the treatment.

This embodiment has the advantages deriving from a small number (two) of air conditioning environments, ie low installation and operating costs, and also the advantages deriving from completely separate environments, ie high reliability in controlling the climatic conditions in each environment.

Independently of the embodiment used, the humidity control is effected on the basis of traditional criteria.

We claim:

1. A process for continuously drying and stabilizing a pasta product comprising subjecting said pasta product to a plurality of cycles, each comprising an intense drying stage in which said product reaches a prefixed value of temperature and humidity and a stabilizing stage for cooling said product in which the air temperature exceeds the dew point and said product is kept at the same value of humidity of said previous intense drying stage, wherein said pasta product is ventilated during said stabilizing phase and whereby ventilated air is indirectly treated by a conditioning fluid to create and maintain a temperature and humidity required for a particular stabilization treatment.

2. An apparatus for implementing the process a claimed in claim 1, comprising means for transferring said pasta product from cycle to cycle comprising a bank of fins traversed by a pipe through which conditioning fluid is circulated, a fan for circulating air within each stage for grazing said bank of fins, a temperature sensor for said conditioning fluid passing through said pipe, a second temperature sensor for said air, a humidity sensor for said air, and a temperature controller for handling signals received from said first and second temperature sensors for controlling the temperature and flow rate of said conditioning fluid in relation to a preset climate to be created for each stage.

3. An apparatus as claimed in claim 2 further comprising a plurality of separate environments having preset climates therein connected together by means for transferring said pasta product from one environment to another along a predetermined path which traverses said environments, in which a drying climate and a stabilizing climate are created alternately.

4. An apparatus as claimed in claim 2 further comprising a tunnel traversed longitudinally by conveying means for the pasta product and wherein said tunnel houses a plurality of drying and stabilizing units located alternately along a direction of advancement of said pasta product.

5. An apparatus as claimed in claim 2 comprising two separate environments wherein said first environment contains a drying climate and wherein said second environment contains a stabilizing climate, said environments being connected together by a plurality of conveying means for the pasta product, whereby said product passes alternately from one environment to the other.

6. An apparatus as claimed in claim 2, wherein said temperature controller is a microprocessor.

7. An apparatus as claimed in claim 2, wherein said pipe which traverses said bank of fins extends external to said environment into a circuit comprising members for varying temperature flow rate of said conditioning fluid under the control of said temperature controller.

* * * * *